(12) United States Patent
Sugiyama et al.

(10) Patent No.: US 7,688,047 B2
(45) Date of Patent: Mar. 30, 2010

(54) POWER CIRCUIT AND METHOD OF RISING OUTPUT VOLTAGE OF POWER CIRCUIT

(75) Inventors: Minoru Sugiyama, Hyogo (JP); Shoichi Nitta, Osaka (JP); Tomonari Kato, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 323 days.

(21) Appl. No.: 10/543,646

(22) PCT Filed: Nov. 30, 2004

(86) PCT No.: PCT/JP2004/018097

§ 371 (c)(1),
(2), (4) Date: May 15, 2006

(87) PCT Pub. No.: WO2005/055405

PCT Pub. Date: Jun. 16, 2005

(65) Prior Publication Data

US 2006/0255782 A1 Nov. 16, 2006

(30) Foreign Application Priority Data

Dec. 2, 2003 (JP) ............................. 2003-403194

(51) Int. Cl.
*G05F 1/59* (2006.01)
(52) U.S. Cl. .................. 323/268; 323/350; 323/901
(58) Field of Classification Search .............. 323/268, 323/901, 350, 269, 274; 363/49
See application file for complete search history.

(56) References Cited

U.S. PATENT DOCUMENTS

| | | | |
|---|---|---|---|
| 5,258,701 A * | 11/1993 | Pizzi et al. ............. 323/269 |
| 6,163,140 A | 12/2000 | Garnett et al. | |
| 6,229,289 B1 | 5/2001 | Piovaccari et al. | |
| 6,366,065 B1 * | 4/2002 | Morita ................. 323/280 |
| 6,424,128 B1 * | 7/2002 | Hiraki et al. .......... 323/268 |
| 6,597,158 B2 * | 7/2003 | Umeda ................ 323/268 |
| 6,636,023 B1 * | 10/2003 | Amin .................. 323/268 |
| 6,646,424 B2 * | 11/2003 | Zinn et al. ............ 323/268 |
| 7,148,670 B2 * | 12/2006 | Inn et al. .............. 323/283 |
| 7,253,596 B2 * | 8/2007 | Yamamoto et al. ...... 323/281 |
| 2002/0079866 A1 * | 6/2002 | Odaohhara ............. 320/150 |
| 2003/0067289 A1 | 4/2003 | Morita | |
| 2003/0234635 A1 | 12/2003 | Currelly et al. | |

FOREIGN PATENT DOCUMENTS

| | | |
|---|---|---|
| EP | 1376836 A2 | 1/2004 |
| JP | 11-3126 | 1/1999 |

(Continued)

OTHER PUBLICATIONS

May 7, 2008 European search report in connection with corresponding European patent application No. EP 04 81 9954.

(Continued)

*Primary Examiner*—Harry Behm
(74) *Attorney, Agent, or Firm*—Cooper & Dunham, LLP

(57) ABSTRACT

The power circuit includes a switching regulator part, a series regulator part and a control circuit part for controlling operation of the switching regulator and controlling the second predetermined voltage of the series regulator part.

20 Claims, 6 Drawing Sheets

FOREIGN PATENT DOCUMENTS

| | | |
|---|---|---|
| JP | 2001-128445 | 5/2001 |
| JP | 2003-9515 | 1/2003 |
| JP | 3394915 | 1/2003 |
| JP | 2003-102165 | 4/2003 |
| JP | 2003-216247 | 7/2003 |
| JP | 2003-525013 | 8/2003 |

OTHER PUBLICATIONS

Jun. 24, 2008 Japanese official action in connection with a counterpart Japanese patent application No. 2003-403194.

* cited by examiner

200
POWER CIRCUIT AND METHOD OF RISING OUTPUT VOLTAGE OF POWER CIRCUIT

TECHNICAL FIELD

This disclosure relates to a power circuit, and more particularly, to a power circuit and a method of rising output voltage of a power circuit.

BACKGROUND ART

As for commonly used direct-current power supply, there are a switching regulator and a series regulator. Switching regulators are used for many apparatuses since they provide high efficiency. With the switching regulator, however, there is a considerable drop in its efficiency when supplying power to a small load which consumes little current due to the switching regulator having a large ripple in output power and noise during operation and consuming a relatively large amount of power inside. Furthermore, the switching regulator has a disadvantage of being liable of considerably damaging the load due to the switching regulator having a relatively slow rise of power and a relatively slow response time for input power change and load change.

Therefore, conventionally, a soft start circuit is provided for preventing generation of overshoot noise by delaying the output voltage rise when turning on the power supply (For example, Japanese Laid-Open Patent Application Nos. 2000-102243 and 2001-128445).

FIG. 5 is a circuit diagram of a conventional example of a switching regulator provided with a soft start circuit. It is to be noted that although FIG. 5 shows a switching regulator of a type which lowers voltage of input power, a switching regulator of a type which raises voltage of input power may be used alternatively.

The switching regulator illustrated in FIG. 5 includes a switching transistor Ma for executing output control of input voltage Vin, an inductor La along with a condenser Ca for energy conversion, a transistor Mb for synchronous rectification (synchronous rectification transistor), a PWM control circuit for executing switching control between the synchronous rectification transistor Mb and the switching transistor Ma, and resistances Ra and Rb for output voltage detection. Furthermore, the switching regulator 100 includes a reference voltage generation circuit 102 for generating and outputting reference voltage Vref, an amplifier AMP for executing operation of the PWM control circuit 101 in accordance with voltage difference between the reference voltage Vref and divided voltage of output voltage Vout being divided at the resistances Ra and Rb, a time constant circuit including a resistance Rc and a condenser Cb for applying the reference voltage Vref, in a gradually rising manner, to the amplifier AMP when turning on the power, and a switch SW1.

Here, only the soft start circuit is described below.

The switch 1 is switched on at the same time when power is turned on, and thus the condenser Cb is charged with the reference voltage Vref via the resistance Rc. Accordingly, voltage Va at a noninverting input terminal rises gradually in a manner shown in FIG. 6. Since the output voltage Vout of the switching regulator 100 is proportional to the reference voltage Vref, the output voltage Vout also rises gradually in a manner shown in FIG. 6. This prevents noise from being generated by overshoot.

However, with such method of gradually raising the output voltage Vout to a predetermined voltage by gradually raising the reference voltage, a certain amount of time is needed for the output voltage Vout to reach the predetermined voltage.

Accordingly, after the power is turned on, a considerable amount of time is required until commencing operation of an apparatus.

SUMMARY

In an aspect of this disclosure, a power circuit for outputting an output voltage includes: a switching regulator pan for regulating input voltage to a first predetermined voltage and outputting a first output voltage to an output terminal; a series regulator part for regulating the input voltage to a second predetermined voltage and outputting a second output voltage to the output terminal; and a control circuit part for controlling operation of the switching regulator and controlling the second predetermined voltage of the series regulator part; wherein immediately after power is turned on, the control circuit part stops the switching regulator part from outputting the first output voltage and activates the series regulator part so that the second predetermined voltage is output from the series regulator part, and wherein when the second output voltage output from the series regulator reaches the second predetermined voltage, the control circuit part stops the series regulator part from outputting the second output voltage and activates the switching regulator part so that the first output voltage of the first predetermined voltage is output from the switching regulator part.

In the power circuit according to an embodiment of the present invention, after the first output voltage reaches the first predetermined voltage, the control circuit part may change the second predetermined voltage so that a voltage smaller than the first predetermined voltage is output from the series regulator part.

In the power circuit according to an embodiment of the present invention, the control circuit part may activate the switching regulator part when a first predetermined time elapses from the turning on of power.

In the power circuit according to an embodiment of the present invention, the first predetermined time may be no less than a period beginning from when the power is turned on and ending when the second output voltage of the series regulator part reaches the second predetermined voltage.

In the power circuit according to an embodiment of the present invention, the control circuit part may monitor the second output voltage of the series regulator part and may activate the switching regulator part to start output when the second output voltage of the series regulator part becomes a voltage no less than the second predetermined voltage.

In the power circuit according to an embodiment of the present invention, when a second predetermined time elapses after the output of the switching regulator part is started, the control circuit part may change the second predetermined voltage so that a voltage smaller than the first predetermined voltage is output from the series regulator part.

In the power circuit according to an embodiment of the present invention, the second predetermined time may be no less than a period beginning from when the output of the switching regulator part is started and ending when the first output voltage reaches the first predetermined voltage.

In the power circuit according to an embodiment of the present invention, the control circuit part may control a load connected to the output terminal, wherein between a period beginning from when the power is turned on and ending when the second predetermined voltage is changed so that a voltage smaller than the first predetermined voltage is output from the series regulator part, the control circuit part may control the load so that the load becomes a less load state being a state where a less amount of current is consumed compared to a normal operation.

In the power circuit according to an embodiment of the present invention, the control circuit part may control the load so that the load becomes a normal state being a state where a normal amount of current is consumed when the second predetermined voltage is changed so that a voltage smaller than the first predetermined voltage is output from the series regulator part.

In the power circuit according to an embodiment of the present invention, the series regulator part may include a voltage control transistor for outputting current from the input terminal to the output terminal in accordance with an input control signal, a first reference voltage generation circuit part for generating and outputting a first predetermined reference voltage, a first output voltage detection circuit part for detecting the output voltage, and generating and outputting a proportional voltage proportional to the detected output voltage, and a voltage control transistor control circuit part for controlling operation of the voltage control transistor so that the proportional voltage becomes the first predetermined reference voltage, wherein the first reference voltage generation circuit part may generate and output the first predetermined reference voltage in accordance with a control signal from the control circuit part.

In the power circuit according to an embodiment of the present invention, the first reference voltage generation circuit part may include a D/A converter for generating and outputting the first predetermined reference voltage in accordance with input digital data, wherein the control circuit part may control voltage value of the first predetermined reference voltage output from the D/A converter by changing digital data indicated by the control signal.

In the power circuit according to an embodiment of the present invention, the series regulator part may include a voltage control transistor for outputting current from the input terminal to the output terminal in accordance with an input control signal, a first reference voltage generation circuit part for generating and outputting a first predetermined reference voltage, a first output voltage detection circuit part for detecting the output voltage, and generating and outputting a proportional voltage proportional to the detected output voltage, and a voltage control transistor control circuit part for controlling operation of the voltage control transistor so that the proportional voltage becomes the first predetermined reference voltage, wherein the first output voltage detection circuit part may generate the proportional voltage by dividing the output voltage with a voltage dividing ratio being in accordance with the control signal from the control circuit part.

In the power circuit according to an embodiment of the present invention, the switching regulator part may include a switching transistor circuit part for controlling output of the input voltage by switching in accordance with an input control signal, a second reference voltage generation circuit part for generating and outputting a second predetermined reference voltage, a second output voltage detection circuit part for detecting the output voltage, and generating and outputting a proportional voltage proportional to the detected output voltage, a switching control circuit part for controlling switching of the switching transistor circuit part so that the proportional voltage becomes the second predetermined reference voltage, and a smoothing circuit part for smoothing an output signal of the switching transistor circuit part and outputting the signal to the output terminal, wherein the series regulator part, the control circuit part, the switching transistor circuit part, the second output voltage detection circuit part, and the switching control circuit part may be integrated on a single integrated circuit.

In another aspect of this disclosure, there is provided a method of rising output voltage of a power circuit including a switching regulator part for regulating input voltage to a first predetermined voltage and outputting a first output voltage to an output terminal, a series regulator part for regulating the input voltage to a second predetermined voltage and outputting a second output voltage to the output terminal, and a control circuit part for controlling operation of the switching regulator and controlling the second predetermined voltage of the series regulator part, the method including the steps of: stopping the switching regulator part from outputting the first output voltage and activating the series regulator part so that the second predetermined voltage is output from the series regulator part immediately after power is turned on; and stopping the series regulator part from outputting the second output voltage and activating the switching regulator part so that the first output voltage of the first predetermined voltage is output from the switching regulator part when the second output voltage output from the series regulator reaches the second predetermined voltage.

In the method according to an embodiment of the present invention, after the first output voltage reaches the first predetermined voltage, the second predetermined voltage may be changed so that a voltage smaller than the first predetermined voltage is output from the series regulator part.

In the method according to an embodiment of the present invention, the switching regulator part may be activated when a first predetermined time elapses from the turning on of power.

In the method according to an embodiment of the present invention, the first predetermined time may be no less than a period beginning from when the power is turned on and ending when the second output voltage of the series regulator part reaches the second predetermined voltage.

In the method according to an embodiment of the present invention, the second output voltage of the series regulator part may be monitored and the switching regulator part may be signaled to start output when the second output voltage of the series regulator part becomes a voltage no less than the second predetermined voltage.

In the method according to an embodiment of the present invention, when a second predetermined time elapses after the output of the switching regulator part is started, the second predetermined voltage may be changed so that a voltage smaller than the first predetermined voltage is output from the series regulator part.

In the method according to an embodiment of the present invention, the second predetermined time may be no less than a period beginning from when the output of the switching regulator part is started and ending when the first output voltage reaches the first predetermined voltage.

In the method according to an embodiment of the present invention, a load connected to the output terminal may be controlled, wherein between a period beginning from when the power is turned on and ending when the second predetermined voltage is changed so that a voltage smaller than the first predetermined voltage is output from the series regulator part, the load may be controlled so that the load becomes a less load state being a state where a less amount of current is consumed compared to a normal operation.

In the method according to an embodiment of the present invention, the load may be controlled so that the load becomes a normal state being a state where a normal amount of current is consumed when the second predetermined voltage is changed so that a voltage smaller than the first predetermined voltage is output from the series regulator part.

BRIEF DESCRIPTION OF DRAWINGS

FIG. 6 is a drawing showing examples of waveforms for each part of FIG. 5 when turning the power on.

BEST MODE FOR CARRYING OUT THE INVENTION

Figure 1:
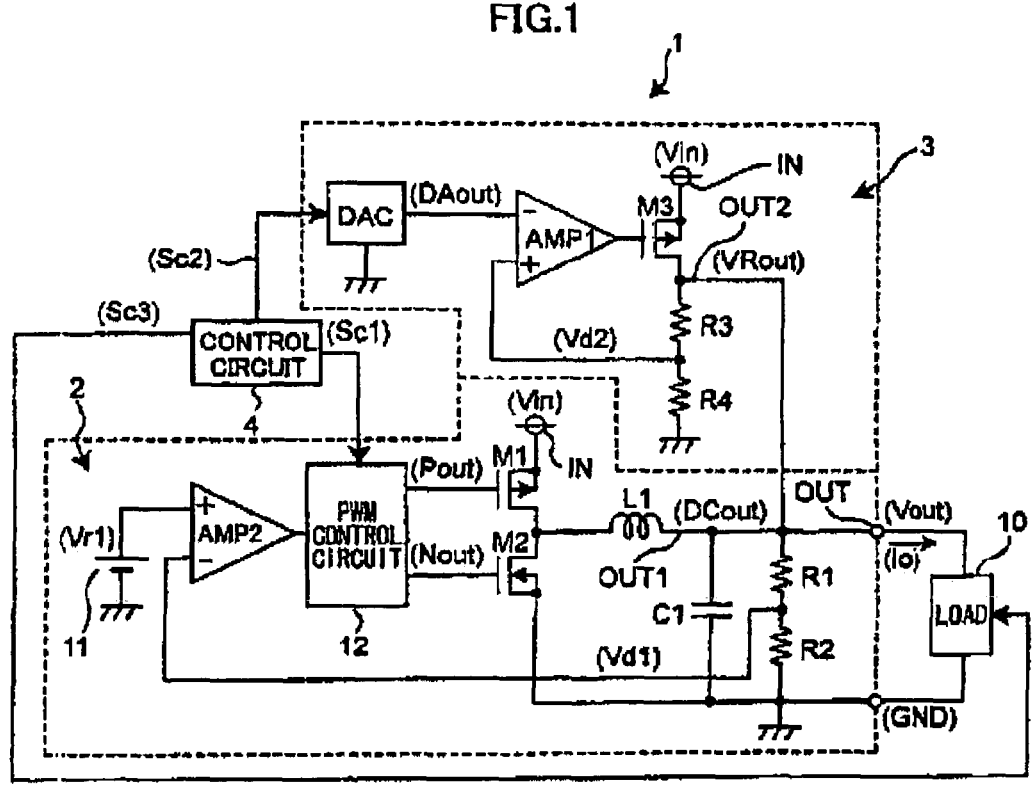
FIG. 1 is a drawing showing an exemplary configuration of a power circuit according to a first embodiment of the present invention.

The present invention is described in detail based on the embodiments illustrated in the drawings.

Figure 2:
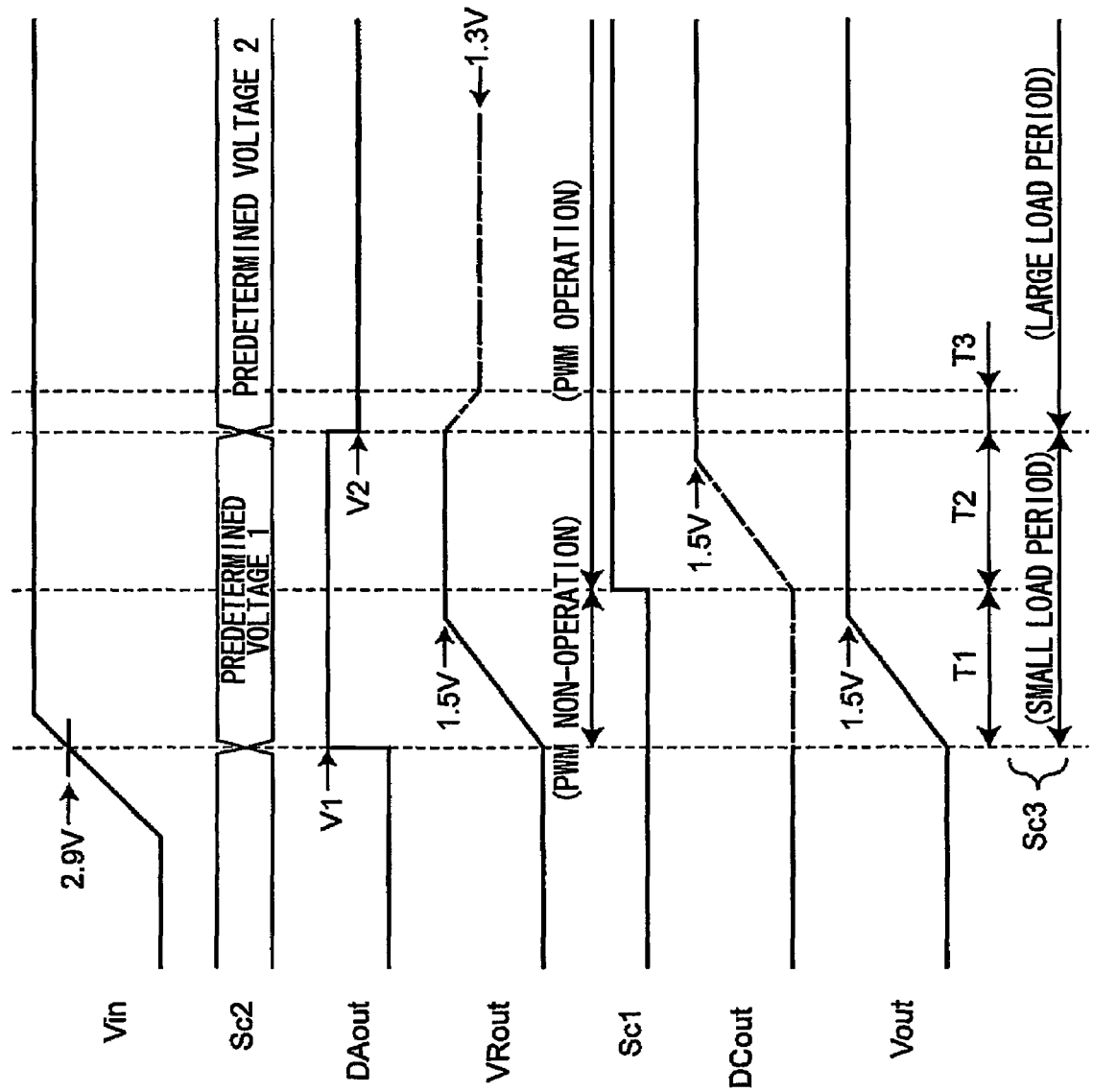
FIG. 2 is a timing chart showing examples of waveforms of signals for each part of FIG. 1.

FIG. 1 is a drawing showing an exemplary configuration of a power circuit according to a first embodiment of the present invention, and FIG. 2 is a timing chart showing examples of waveforms of signals for each part of the power circuit illustrated in FIG. 1.

In FIG. 1, a power circuit 1 includes a switching regulator 2, a series regulator 3, and a control circuit 4. The switching regulator 2 and the series regulator 3, respectively, supply power to a load 10 connected to an output terminal OUT. The control circuit 4 monitors input voltage Vin and controls the state of the switching regulator 2, the state of the series regulator 3, and the state of the load 10, respectively.

An output terminal OUT1 of the switching regulator 2 and an output terminal OUT2 of the series regulator 3 are both connected to the output terminal OUT of the power circuit 1. It is to be noted that, for the sake of convenience, change of voltage in some case is described by supposing that the output terminal OUT1 of the switching regulator 2 and the output terminal OUT2 of the series regulator 3 are not connected. In such a case, the voltage from the output terminal of each regulator may be different from the actual voltage and may be illustrated as the dash-dot line in FIG. 2. The actual voltage is, however, the same as the output voltage Vout.

The switching regulator 2 has a switching transistor M1 including a PMOS transistor for executing output control of the input voltage Vin, a transistor M2 for synchronous rectification (synchronous rectification transistor) M2 including a NMOS transistor, an inductor La along with a condenser C1 for energy conversion, and resistances R1, R2 which divide voltage Vout output from the output terminal OUT and output the divided voltage Vd1 for output voltage detection.

Furthermore, the switching regulator 2 also has a reference voltage generation circuit 11 for generating and outputting a predetermined reference voltage Vr1, an amplifier AMP2 for executing operation of a PWM control circuit 12 in accordance with the voltage difference between the reference voltage Vr1 and the divided voltage Vd1 and outputting a voltage in accordance with the result of the comparison, and the PWM control circuit 12 for executing switching control of the switching transistor M1 and the synchronous rectification transistor M2 by performing PWM control on the switching transistor M1 and the synchronous rectification transistor M2 in accordance with the voltage output from the amplifier AMP2.

The switching transistor M1 and the synchronous rectification transistor M2 are connected in series between the input terminal IN (to which input voltage Vin is input) and a ground voltage GND. An inductor L1 is connected between a part connecting the switching transistor M1 and the synchronous rectification transistor M2 and the output terminal OUT. A series circuit of resistances R1, R2 and a condenser C1 are connected in parallel between the output terminal OUT and the ground voltage GND. The resistances R1, R2 generate the divided voltage Vd1 and output the divided voltage Vd1 to the inverting input terminal of the amplifier AMP2. The PWM control circuit 12 operates in accordance with a PWM signal (s) from the control circuit 4. The load 10 is connected between the output terminal OUT and the ground voltage GND.

The series regulator 3, meanwhile, has a voltage control transistor M3 including a PMOS transistor for controlling current output to the output terminal OUT so that the output voltage Vout becomes a predetermined voltage, and resistances R3, R4 for output voltage detection which divide voltage Vout output from the output terminal OUT and output the divided voltage Vd2 for output voltage detection. Furthermore, the series regulator 3 also has a D/A converter DAC for generating and outputting voltage DAout in accordance with a input digital code(s), and an operational amplifier circuit AMP1 for executing operation of the voltage control transistor M3 in accordance with voltage difference between the divided voltage Vd2 and the voltage DAout.

It is to be noted that the switching regulator 2 is included in a switching regulator part, the series regulator 3 is included in a series regulator part, and the control circuit 4 is included in a control circuit part, respectively. Furthermore, the D/A converter DAC is included in a first reference voltage generation circuit part, resistances R3, R4 are included in a first output voltage detection circuit part, and the operational amplifier circuit AMP1 is included a voltage control transistor control circuit part. Furthermore, the switching transistor M1 and the synchronous rectification transistor M2 are included in a switching transistor part, the reference voltage generation circuit 11 is included in a reference voltage generation circuit part, the amplifier AMP2 and PWM control circuit are included a switching control circuit part, and the inductor L1 and the condenser C1 include a smoothing circuit.

The voltage control transistor M3 and the resistors R3, R4 are connected in series between the input terminal IN and the ground voltage GND, and a part connecting the voltage control transistor M3 and the resistor R3 is connected to the output terminal OUT. The voltage DAout is input to an inverting input terminal of the operational amplifier circuit AMP1, and the divided voltage Vd2 is input to a noninverting input terminal of the operational amplifier circuit AMP1. The output terminal of the operational amplifier circuit AMP1 is connected to a gate of the voltage control transistor M3. The D/A converter DAC generates and outputs the voltage DAout in accordance with a DAC control signal Sc2 from the control circuit 4.

In a case where the load current io is large, efficiency is low since a large amount of power is consumed at the voltage control transistor M3; however, with the series regulator 3, the ripple of the output voltage Vout and the noise during operation are small, and power consumed inside can be reduced. Therefore, in a case where the load current io is small, efficiency higher than the switching regulator 2 may be attained. Furthermore, with the series regulator 3, the rise time of output voltage can be shortened, the response to change of input voltage Vin and/or to change of load 10 can be accelerated, and a high stability of output voltage can be attained.

With such configuration, when the input voltage Vin reaches a predetermined value (for example, 2.9 V in FIG. 2) after the power is turned on, the control circuit 4 outputs a PWM control signal Sc1 to a PWM control circuit 12 and stops operation of the switching regulator 2 by switching off both the switching transistor M1 and the synchronous rectification transistor M2. At the same time, the control circuit 4 outputs a DAC control signal Sc2 to the D/A converter DAC of the series regulator 3 and sets an output voltage DAout of the D/A converter DAC to a predetermined voltage V1.

The output voltage Vout of the power circuit 1 is raised to a predetermined voltage (for example, 1.5 V in FIG. 2) by the control of the series regulator 3. In this example, the time for an output voltage VRout of the series regulator 3 to positively reach 1.5 V after the input voltage Vin reaches 2.9 V is assumed as time T1. After the elapse of time T1, the control circuit 4 outputs the PWM control signal Sc1 to make the PWM control circuit 12 operational. Thereby, the switching regulator 2 is activated and an output voltage DCout of the switching regulator 2 is raised to a predetermined voltage of 1.5 V. In this example, the time for an output voltage DCout of the switching regulator 2 to positively reach 1.5 V after the switching regulator 2 begins operation is assumed as time T2.

Thus, a series regulator 3 having a short output voltage rise time is first activated, and then the switching regulator 2 is activated after the output voltage Vout of the power circuit 1 reaches a predetermined voltage. Accordingly, output voltage DCout of the switching regulator 2 can rise in a short time without generation of overshoot noise. Furthermore, even where the raising of the output voltage Vout is executed by dividing it into two steps, the output voltage Vout can rise in a time that is several fractions compared to the conventional soft start.

Furthermore, the control circuit 4 controls the operation mode of the load 10 with a load control signal Sc3 until the output voltage DCout of the switching regulator 2 reaches a predetermined voltage, and is able to further shorten the rise time of the output voltage of the series regulator 3 by lowering the load current io to a considerably low amount, for example, to a sleep-mode. It is to be noted that since voltage is output from the output terminal OUT2 of the series regulator 3 during the period of time T2, the PWM control circuit 12 switches off the synchronous rectification transistor M2 by turning the level of the control signal Nout to a low level so that through current can be prevented from being generated by the synchronous rectification transistor M2 of the switching regulator 2.

After the elapse of time T2, the control circuit 4 outputs the DAC control signal SC2 to the D/A converter DAC and sets the output voltage DAout of the D/A converter DAC to a predetermined voltage V2 which is smaller than the predetermined voltage V1. Thus, the operational amplifier circuit AMP1 attempts to lower the output voltage VRout of the series regulator 3 by controlling the voltage control transistor M3. However, the output voltage VRout cannot be lowered since it is fixed at the output voltage DCout of the switching regulator 2. As a result, the voltage of the noninverting input terminal of the operational amplifier circuit AMP1 becomes larger compared to the predetermined voltage V2 serving as a reference voltage, and the output terminal of the operational amplifier circuit 4 turns into a high level, thereby switching off the voltage control transistor M3. Accordingly, no control signal is required for turning off the voltage control transistor M3.

In this example, the time for the voltage control transistor M3 to turn off after the output voltage DAout of the D/A converter DAC is set to the predetermined voltage V2 is assumed as time T3. Furthermore, power efficiency is further heightened by switching the operation mode of the switching regulator 2 from asynchronous control to synchronous control during the time T3.

The control circuit 4 outputs the load control signal Sc3 for switching the load 10 from small load which consumes a small amount of current to large load which consumes a normal amount of current after the switching regulator 2 completely rises, that is, after time T2 elapses, thereby enabling reduction in the amount of output current of the series regulator 3. Furthermore, by switching the load 10 to large load after the reference voltage DAout of the series regulator 3 is lowered to the predetermined voltage V2, the amount of output current of the series regulator 3 can be of a small amount of current that matches with the small load. Therefore, the circuit area can be reduced when integrating the series regulator 3 to a semiconductor apparatus.

Furthermore, it may be preferable to set the predetermined voltage V2 of the output voltage DAout of the D/A converter DAC so that the output voltage VRout of the series regulator 3 enables the voltage control transistor M3 to be completely turned off when the switching regulator is operating and thus enables the circuit to be of minimum operable voltage during small load (e.g. 1.3 V). Accordingly, when an apparatus enters sleep-mode, the operation of the series regulator 3 automatically restarts and a voltage of 1.3 V, for example, required during small load is output only by restricting output of the switching regulator 3. In addition, owing to the small load, power efficiency is heightened compared to when using the switching regulator 2.

Figure 3:
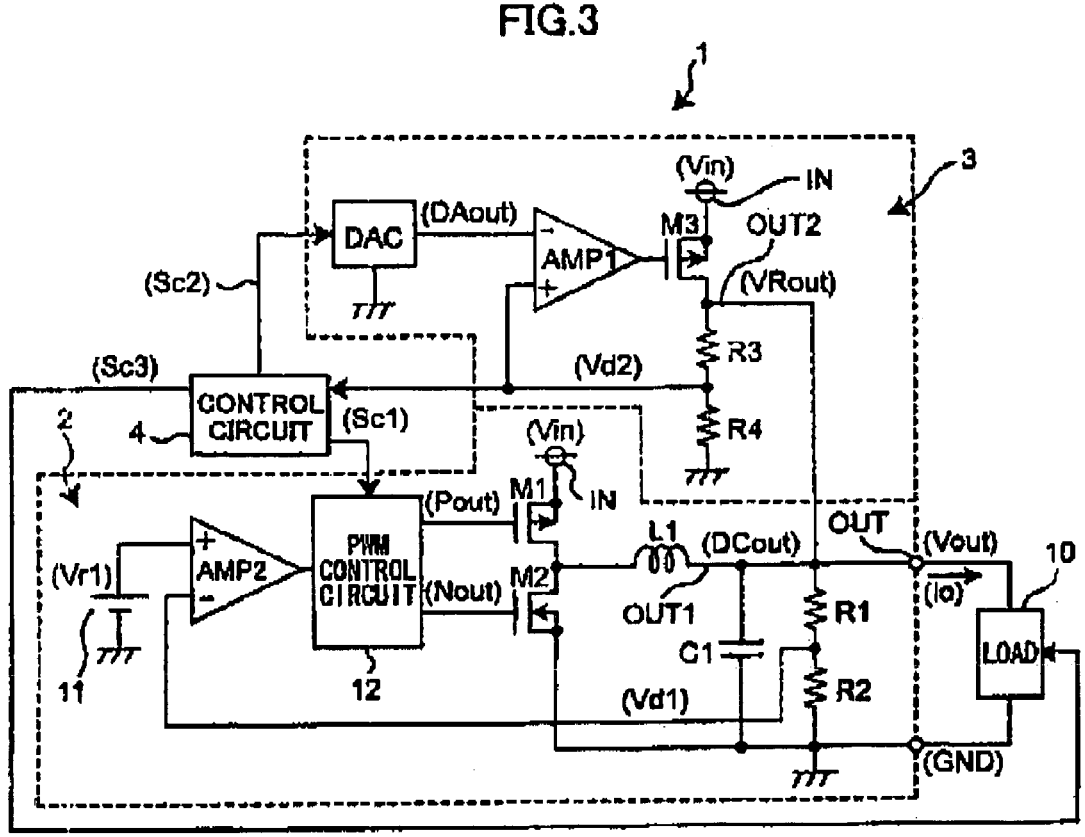
FIG. 3 is a drawing showing another exemplary configuration of a power circuit according to a first embodiment of the present invention.

Next, FIG. 3 is a drawing showing another exemplary configuration of a power circuit according to a first embodiment of the present invention. It is to be noted that, in FIG. 3, like components are denoted by like numerals as of FIG. 1 and will not be further explained. Here, only the different point with respect to FIG. 1 is described.

The different point is that the divided voltage Vd2 of the series regulator 3 is input to the control circuit 4 of FIG. 1. In this case, instead of waiting for the time T1 to pass for shortening rise time of the power circuit 1 as in FIG. 1, the switching regulator 2 is activated (operated) immediately after the output voltage VRout of the series regulator 3 reaches a predetermined voltage, thereby shortening the rise time of the output voltage Vout.

Figure 4:
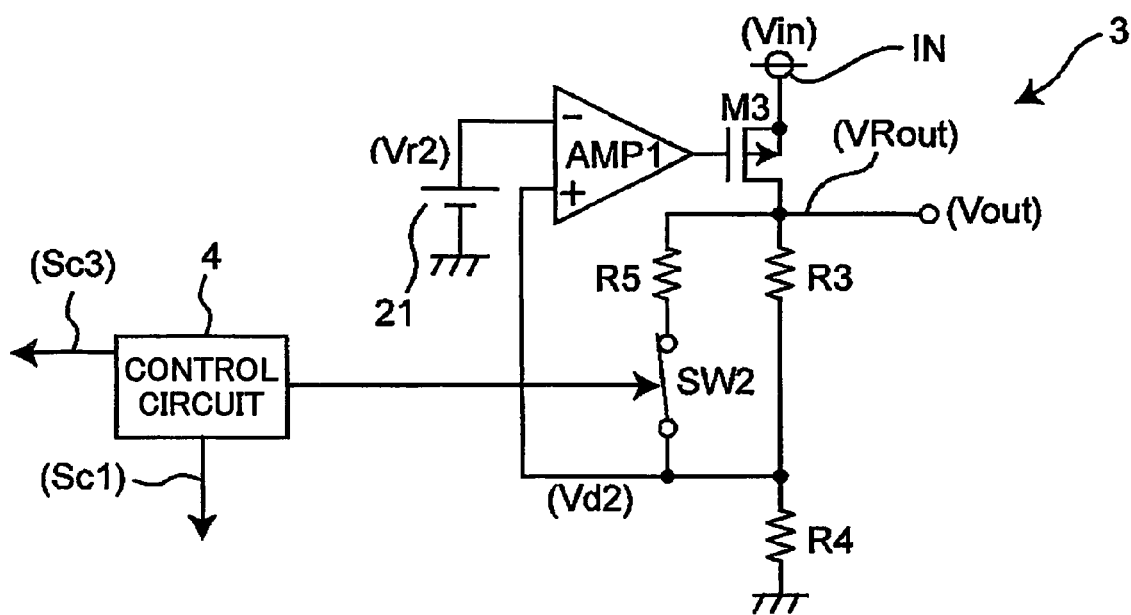
FIG. 4 is a drawing showing another exemplary configuration of a power circuit according to a first embodiment of the present invention.
Figure 5:
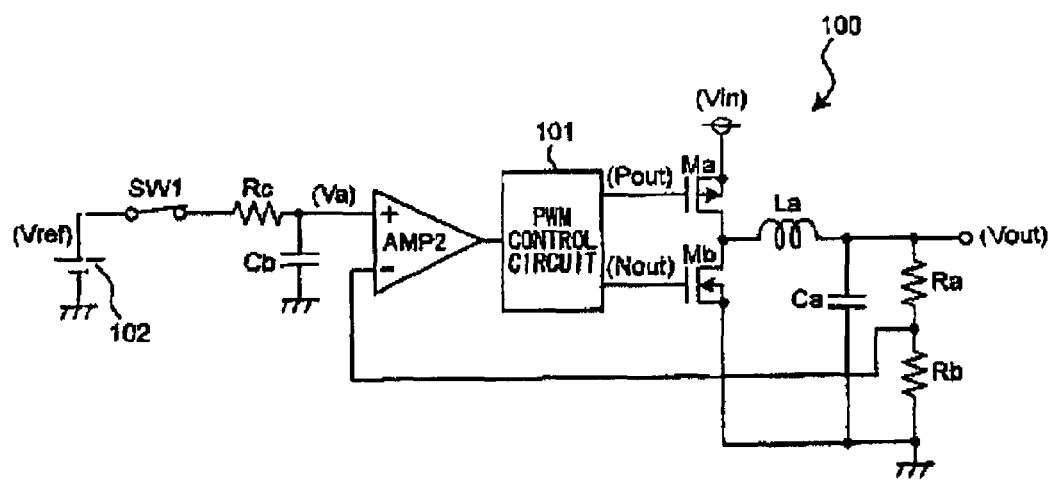
FIG. 5 is a circuit diagram showing a conventional example of a switching regulator.
Figure 6:
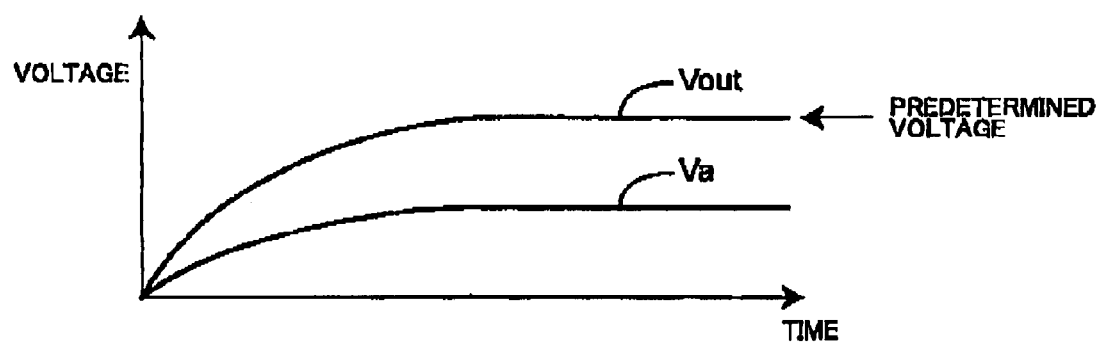

Meanwhile, in FIGS. 1 and 3, the series regulator 3 includes the D/A converter DAC in which the D/A converter DAC outputs voltage DAout in accordance with the DAC control signal Sc2 from the control circuit 4, and the operational amplifier circuit AMP1 controls the operation of the voltage control transistor M3 so that the divided voltage Vd2 becomes the output voltage DAout of the D/A converter DAC. Meanwhile, as shown in FIG. 4, the series regulator 3 includes a reference voltage generation circuit 21 for generating and outputting a predetermined reference voltage Vr2, and the operational amplifier circuit AMP1 may control the operation of the voltage control transistor M3 so that the divided voltage Vd2 becomes the reference voltage. It is to be noted that, in FIG. 4, like components are denoted by like numerals as of FIG. 1 and will not be further explained. Here, only the different points with respect to FIG. 1 are described. Furthermore, FIG. 4 shows an exemplary circuit having a series regulator 3 different from that of FIG. 1 and omits the switching regulator 2 since it is the same as that of FIG. 1.

In FIG. 4, the series regulator 3 includes a voltage control transistor M3, resistances R3-R5 for output voltage detection, a reference voltage generation circuit 21 for generating and outputting a predetermined reference voltage Vr2, a operational amplifier circuit AMP1 for controlling the voltage control transistor M3 in accordance with the voltage difference between the divided voltage Vd2 and the reference voltage Vr2, and a switch SW2. It is to be noted that the reference voltage generation circuit 21 is included in a first reference voltage generation circuit part, and the resistances R3-R5 and the switch SW2 are included in a first output voltage detection circuit part.

The resistance R5 and the switch SW2 is connected in series. Such circuit, being connected in series, is connected to the resistance R3 in parallel. The switch SW2 is controlled (switch-controlled) by the control circuit 4. A reference voltage Vr2 from the reference voltage generation circuit 21 is input to the inverting input terminal of the operational amplifier circuit AMP1.

In this configuration, as an alternative for changing the voltage input to the inverting input terminal of the operational amplifier circuit AMP1, the divided voltage Vd2 is changed. The control circuit 4 switches the switch Sw2 from off to on and connects the resistance R5 and the resistance R3 in parallel after the time T2 elapses. Accordingly, the divided voltage Vd2, being the intersection point between the resistance R3 and the resistance R4, increases. As a result, the output terminal of the operational amplifier circuit AMP1 becomes a high level, thereby controlling the voltage control transistor M3 to decrease the output voltage VRout. Since the output voltage VRout does not decrease in a case where the operational amplifier circuit AMP1 is operating, the voltage control transistor M3 is turned off.

Hence, with the power circuit according to the first embodiment of the present invention, only the series regulator 3 is activated immediately after power is turned on while restricting the output voltage of the switching regulator 2, then the output of the voltage of the switching regulator 2 is started after the time T1 (i.e. time for the output voltage VRout of the series regulator 3 to reach the predetermined voltage) elapses or after the output voltage VRout of the series regulator 3 reaches the predetermined voltage, and then the predetermined output voltage of the series regulator 3 is changed to a value lower than the predetermined voltage after the time T2 (i.e. time for the output voltage DCout of the switching regulator 2 to reach the predetermined voltage. Thereby, the rise time of the output voltage Vout can be shortened, and overshoot noise of the output voltage Vout can be prevented.

Further, the present invention is not limited to these embodiments, but various variations and modifications may be made without departing from the scope of the present invention.

The present application is based on Japanese Priority Application No. 2003-403194 filed on Dec. 2, 2003, with the Japanese Patent Office, the entire contents of which are hereby incorporated by reference.

The invention claimed is:

1. A power circuit for outputting an output voltage, the power circuit comprising:
a switching regulator part for regulating input voltage to a first predetermined voltage and outputting a first output voltage to an output terminal;
a series regulator part for regulating the input voltage to a second predetermined voltage and outputting a second output voltage to the output terminal; and
a control circuit part configured to control operation of the switching regulator part and control the second predetermined voltage of the series regulator part to chance the second output voltage from a first non-zero voltage value to a second non-zero voltage value;
wherein immediately after power is turned on, the control circuit part stops the switching regulator part from outputting the first output voltage and activates the series regulator part so that the second predetermined voltage is output from the series regulator part,
wherein when the second output voltage output from the series regulator reaches the second predetermined voltage, the control circuit part stops the series regulator part from outputting the second output voltage and activates the switching regulator part so that the first output voltage of the first predetermined voltage is output from the switching regulator part, and
wherein after the first output voltage reaches the first predetermined voltage, the control circuit part changes the second predetermined voltage so that a non-zero voltage smaller than the first predetermined voltage is output from the series regulator part.

2. The power circuit as claimed in claim 1, wherein the control circuit part monitors the second output voltage of the series regulator part and activates the switching regulator part to start output when the second output voltage of the series regulator part becomes a voltage no less than the second predetermined voltage.

3. The power circuit as claimed in claim 1,
wherein the control circuit part controls a load connected to the output terminal,
wherein between a period beginning from when the power is turned on and ending when the first predetermined voltage is changed, the control circuit part controls the load so that the loud becomes a less load state,
wherein the less load state is a state in which a less amount of current is consumed compared to a normal operation.

4. The power circuit as claimed in claim 3,
wherein the control circuit part controls the load so that the load becomes a normal state so that a voltage smaller than the first predetermined voltage is output from the series regulator part,
wherein the normal state is a state where a normal amount of current is consumed when the second predetermined voltage is changed.

5. The power circuit as claimed in claim 1,
wherein the series regulator part includes
a voltage control transistor for outputting current from the input terminal to the output terminal in accordance with an input control signal,
a first reference voltage generation circuit part for generating and outputting a first predetermined reference voltage,
a first output voltage detection circuit part for detecting the output voltage, and generating and outputting a proportional voltage proportional to the detected output voltage, and
a voltage control transistor control circuit, part for controlling operation of the voltage control transistor so that the proportional voltage becomes the first predetermined reference voltage,
wherein the first reference voltage generation circuit part generates and outputs the first predetermined reference voltage in accordance with a control signal from the control circuit part.

6. The power circuit as claimed in claim 5, wherein the first reference voltage generation circuit part includes a D/A converter for generating and outputting the first predetermined reference voltage in accordance with input digital data, wherein the control circuit part controls voltage value of the first predetermined reference voltage output from the D/A converter by changing digital data indicated by the control signal.

7. The power circuit as claimed in claim 1,
wherein the series regulator part includes
a voltage control transistor for outputting current from the input terminal to the output terminal in accordance with an input control signal, a first reference voltage generation circuit part for generating and outputting a first predetermined reference voltage, a first output voltage detection circuit part for detecting the output voltage, and generating and outputting a proportional voltage proportional to the detected output voltage, and a voltage control transistor control circuit part for controlling operation of the voltage control transistor so that the proportional voltage becomes the first predetermined reference voltage, wherein the first output voltage detection circuit part generates the proportional voltage by dividing the output voltage with a voltage dividing ratio being in accordance with the control signal from the control circuit part.

8. The power circuit as claimed in claim 1,
wherein the switching regulator part includes
a switching transistor circuit part for controlling output of the input voltage by switching in accordance with an input control signal, a second reference voltage generation circuit part for generating and outputting a second predetermined reference voltage, a second output voltage detection circuit part for detecting the output voltage, and generating and outputting a proportional voltage proportional to the detected output voltage, a switching control circuit part for controlling switching of the switching transistor circuit part so that the proportional voltage becomes the second predetermined reference voltage, and a smoothing circuit part for smoothing an output signal of the switching transistor circuit part and outputting the signal to the output terminal, wherein the series regulator part, the control circuit part, the switching transistor circuit part, the second output voltage detection circuit part, and the switching control circuit part are integrated on a single integrated circuit.

9. The power circuit as claimed in claim 1, wherein the control circuit part activates the switching regulator part when a first predetermined time elapses from the turning on of power.

10. The power circuit as claimed in claim 9, wherein the first predetermined time is no less than a period beginning from when the power is turned on and ending when the second output voltage of the series regulator part reaches the second predetermined voltage.

11. The power circuit as claimed in claim 9, wherein when a second predetermined time elapses after the output of the switching regulator part is started, the control circuit part changes the second predetermined voltage so that a voltage smaller than the first predetermined voltage is output from the series regulator part.

12. The power circuit as claimed in claim 11, wherein the second predetermined time is no less than a period beginning from when the output of the switching regulator part is started and ending when the first output voltage reaches the first predetermined voltage.

13. A method for raising output voltage of a power circuit including a switching regulator part for regulating input voltage to a first predetermined voltage and outputting a first output voltage to an output terminal, a series regulator part for regulating the input voltage to a second predetermined voltage and outputting a second output voltage to the output terminal, and a control circuit part configured to control operation of the switching regulator and control the second predetermined voltage of the series regulator part to change the second output voltage from a first non-zero voltage value to a second non-zero voltage value, the method comprising the steps of:

stopping the switching regulator part from outputting the first output voltage and activating the series regulator part so that the second predetermined voltage is output from the series regulator part immediately after power is turned on; and stopping the series regulator part from outputting the second output voltage and activating the switching regulator part so that the first output voltage of the first predetermined voltage is output from the switching regulator part when the second output voltage output from the series regulator reaches the second predetermined voltage, wherein after the first output voltage reaches the first predetermined voltage, the second predetermined voltage is changed so that a non-zero voltage smaller than the first predetermined voltage is output from the series regulator part.

14. The method as claimed in claim 13, wherein the second output voltage of the series regulator part is monitored and the switching regulator part is signaled to start output when the second output voltage of the series regulator part becomes a voltage no less than the second predetermined voltage.

15. The method as claimed in claim 13,
wherein a load connected to the output terminal is controlled,
wherein between a period beginning from when the power is turned on and ending when the first predetermined voltage is changed, the load is continued so that the load becomes a less load state,
wherein the less load state is a state in which a less amount of current is consumed compared to a normal operation.

16. The method as claimed in claim 15,
wherein the load is controlled so that the load becomes a normal state so that a voltage smaller than the first predetermined voltage is output from the series regulator part,
wherein the normal state is a state where a normal amount of current is consumed when the second predetermined voltage is changed.

17. The method as claimed in claim 13, wherein the switching regulator part is activated when a first predetermined time elapses from the turning on of power.

18. The method as claimed in claim 17, wherein the first predetermined time is no less than a period beginning from when the power is turned on and ending when the second output voltage of the series regulator part reaches the second predetermined voltage.

19. The method as claimed in claim 17, wherein when a second predetermined time elapses after the output of the switching regulator part is started, the second predetermined voltage is changed so that a voltage smaller than the first predetermined voltage is output from the series regulator part.

20. The method as claimed in claim 19, wherein the second predetermined time is no less than a period beginning from when the output of the switching regulator part is started and ending when the first output voltage reaches the first predetermined voltage.

* * * * *